July 24, 1962
W. S. KINNARD
3,045,572
STEREOSCOPIC CAMERA
Filed April 23, 1956
2 Sheets-Sheet 1
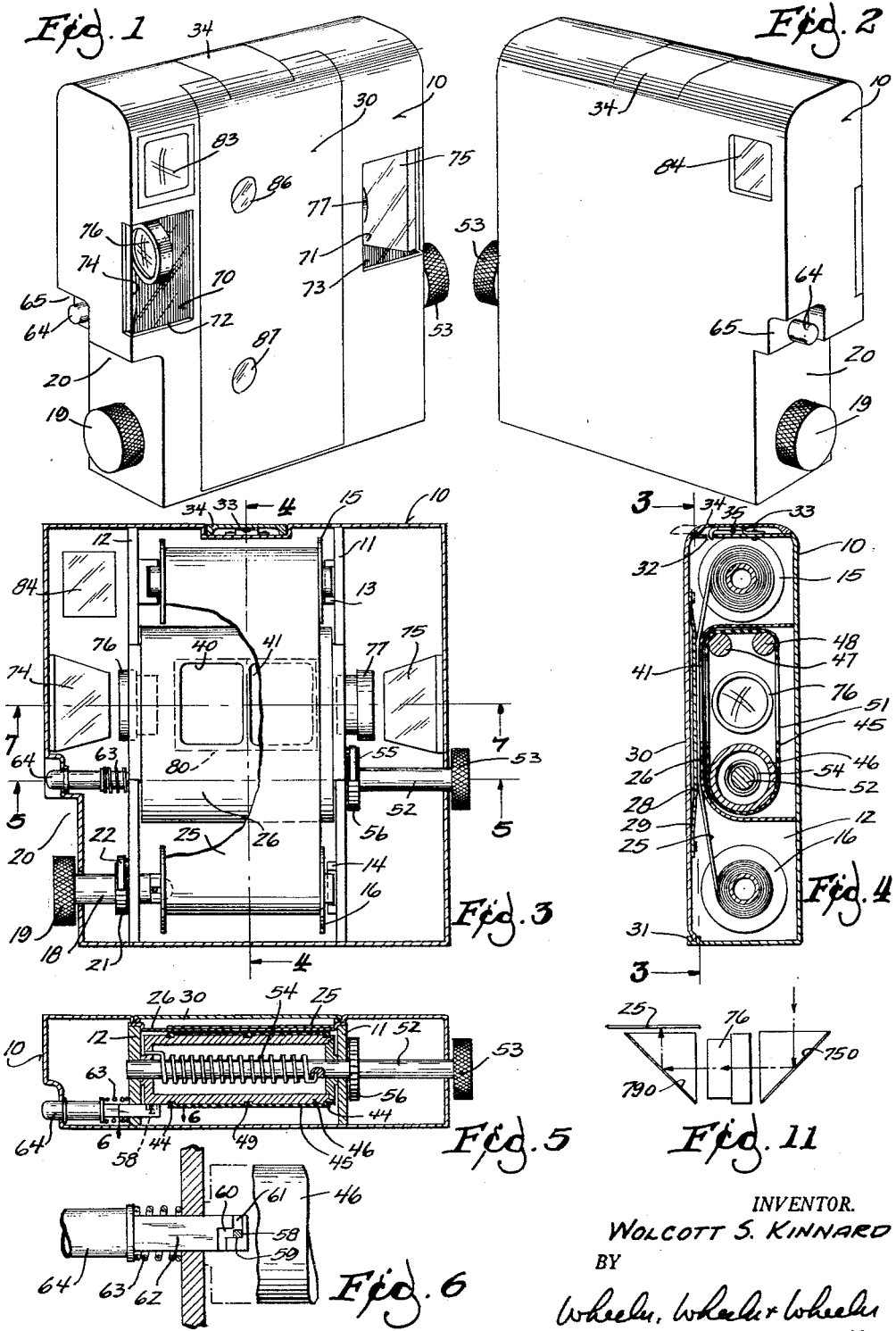
INVENTOR.
WOLCOTT S. KINNARD
BY
Wheeler, Wheeler & Wheeler
ATTORNEYS July 24, 1962
W. S. KINNARD
3,045,572
STEREOSCOPIC CAMERA
Filed April 23, 1956
2 Sheets-Sheet 2
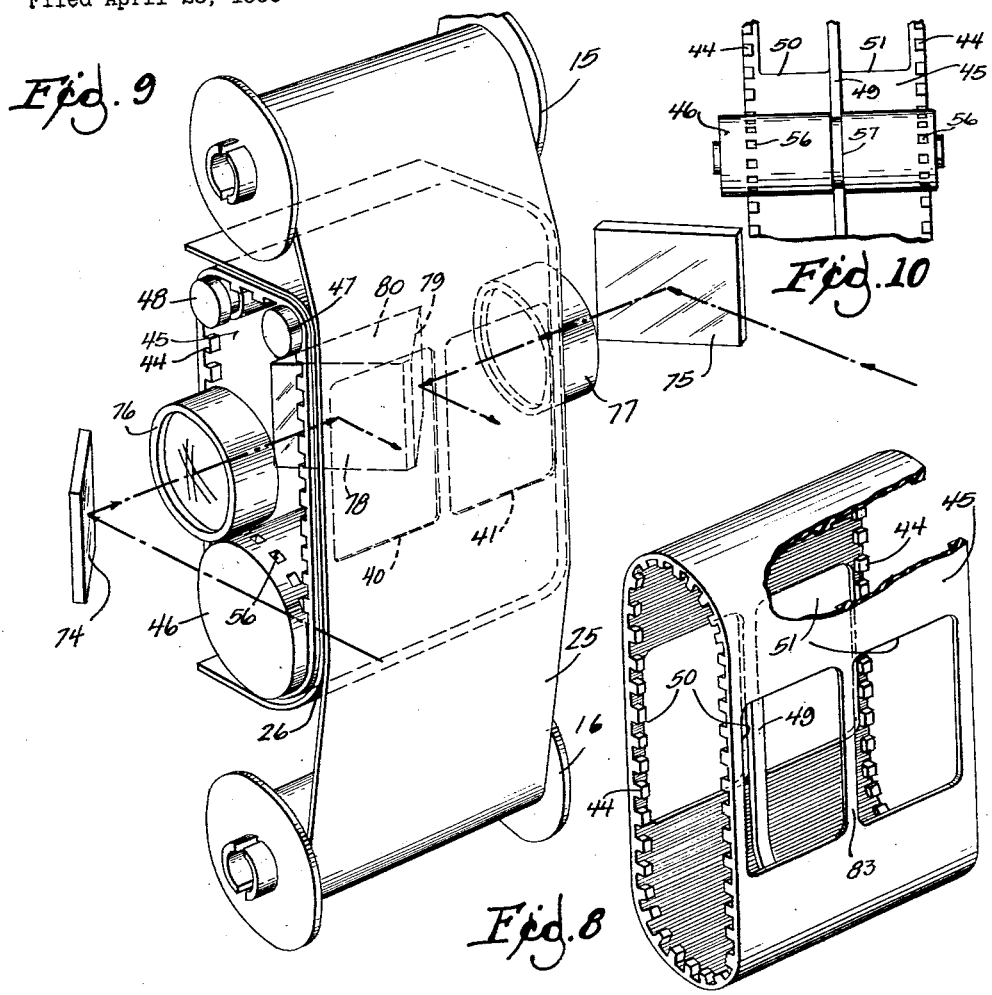
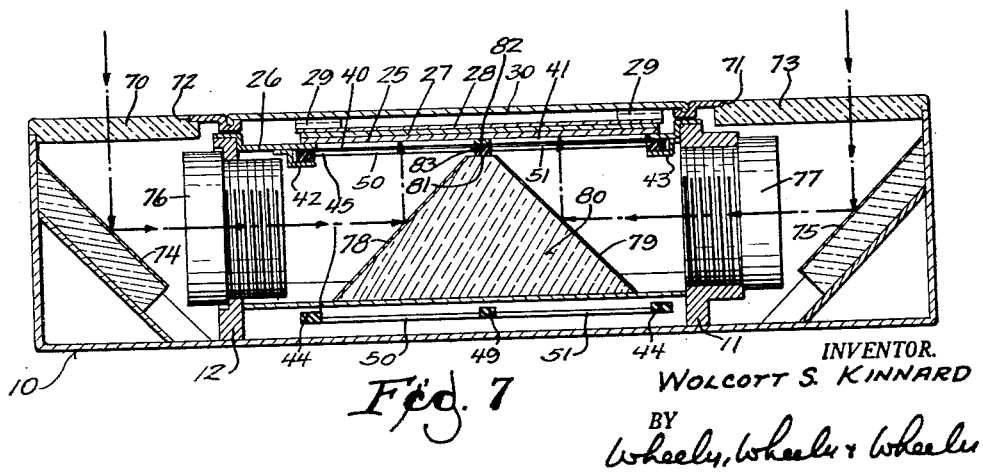
INVENTOR.
WOLCOTT S. KINNARD
BY
Wheely, Wheeler & Wheeler
ATTORNEYS

United States Patent Office 3,045,572
Patented July 24, 1962

3,045,572
STEREOSCOPIC CAMERA
Wolcott S. Kinnard, 4665 N. 56th St., Milwaukee, Wis.
Filed Apr. 23, 1956, Ser. No. 579,956
13 Claims. (Cl. 95—18)

This invention relates to a stereoscopic camera.

Stereoscopic cameras have presented peculiar problems which have seemed heretofore to be insoluble. One of these has involved the difficulty of mounting the two pictures with sufficient accuracy even for hand viewing. Because photographic lenses reverse the image, pictures taken with an ordinary stereoscopic camera must be cut apart and transposed for mounting purposes. In order to project stereoscopic pictures, the accuracy of alignment in the mount should desirably be within a total tolerance of .002 inch and this degree of accuracy is beyond the capacity of the usual automatic equipment. It is even difficult to realign the pictures in the mount with adequate accuracy even if the work is done by hand and with every available scientific assistance.

The present invention relates to an integrated organization in a stereoscopic camera of the optics, the film mounting and the shutter which not only achieves a practical solution of the above problems but also has many incidental advantages. In preferred practice of the invention, the film is at the front of the camera with its emulsion side facing rearwardly, the film spools being above and below the plane of the lenses so that the direction of film transport is transverse with respect to a line drawn between the lenses. The paths of the light admitted at two points in front of the camera carry the light past the side edges of the film, thence toward the center of the camera and thence forwardly toward the emulsion face of the film, the images thereby being reproduced in properly oriented positions side by side on the film for viewing. No transposition is required. The film pairs are not cut apart.

This involves the use of mirrors, but any loss of light is more than compensated by the use of an endless belt focal plane shutter within which some of the optical elements are disposed. Great advantages are found in having the lenses in the interior of the camera in transverse axial alignment with each other, the axis of alignment being at right angles to the direction of sight.

While the elimination of any necessity of transposition was a major object of the invention, it has been found that the particular organization herein disclosed results in an ideal frame size with respect to the resolving power of the emulsion, particular reference being made to conventional color film. While either 35 mm. or standard number 828 film may be used advantageously without separating too widely the lines of sight, standard 828 film is the preferred choice. It produces sixteen exposures per roll of stereoscopic pairs of transparencies which are disposed vertically and are 14 x 17 mm. in size.

The camera was not designed to reduce film cost but to produce the best possible results. Yet it has resulted in important economies in the use of film. The camera was not designed primarily with the objective of compactness. Yet it is extraordinarily compact, measuring only 3½ x 3½ x 15/16 of an inch without any protruding parts. The fact is that the thickness of the case is not appreciatively greater than the space required for the film spools, the shutter apron and optics all lying within a case thickness which only slightly exceeds the diameter of the spool head. The camera was designed with a view to excellent performance rather than low cost; yet the camera as developed will not only give superior results, but will sell for a relatively modest price. The camera was not designed primarily with simplicity of operation in view. Yet it is so extraordinarily simple as to produce pictures of superior quality even in the hands of persons without special photographic ability or training.

Other important features or advantages of the constructions embodying the invention include a shutter belt having two pairs of exposure openings, the belt being precisely twice as long as the periphery of its controlling drum, and being geared to the controlling drum so that one pair of exposure openings moves past the framing openings in each complete rotation of the controlling drum.

There is also a special catch for the panel which opens to give access to the film or plate. This catch has applications other than this particular camera but it happens to be ideally correlated with the present camera in that the catch involves no part which normally protrudes in any way from the camera case. Yet the catch includes a slide which is readily displaced from the camera case to provide a lever which may then be manipulated to release the catch.

In the drawings:

FIG. 1 is a three-quarter front perspective view of a camera embodying the invention.

FIG. 2 is a three-quarter rear perspective view of the camera.

FIG. 3 is a view taken in section on line 3—3 of FIG. 4.

FIG. 4 is a view taken in section on line 4—4 of FIG. 3, with the central double mirror omitted.

FIG. 5 is a view taken in section on line 5—5 of FIG. 3.

FIG. 6 is a view taken in section on a greatly enlarged scale on line 6—6 of FIG. 5.

FIG. 7 is a view taken in section on a greatly enlarged scale on line 7—7 of FIG. 3.

FIG. 8 is a view in perspective on an enlarged scale of the endless belt focal plane shutter.

FIG. 9 is a diagrammatic perspective view on an enlarged scale showing the relationship between the optical system, the focal plane shutter and the film, wherein the invention particularly resides.

FIG. 10 is a diagrammatic plan view of a driving and controlling drum for the shutter belt with a fragmentary portion of the shutter belt underlying it to show the intergeared relationship.

FIG. 11 is a diagrammatic plan view showing the equivalence of certain prisms for the first surface mirrors elsewhere illustrated.

No effort is being made to disclose camera details which are irrelevant to the organization best shown in FIG. 9 and to which the present invention pertains. For this reason, there is no disclosure herein of control of lens focusing or diaphragm openings or shutter speeds or the like. While I have special devices for these purposes, it may be assumed for the purposes of the present disclosure that any conventional equipment of this sort will be used.

The case 10 has laterally spaced partitions 11 and 12 extending from top to bottom to form the side walls of a film chamber as best shown in FIGS. 3 and 7. These support the upper and lower mounts 13 and 14 for the supply and takeup film spools 15 and 16, the latter being wound by a shaft 18 projecting through the side of the case and equipped with a knob 19. The case is conveniently notched at 20 to accommodate this knob. A ratchet 21 on the takeup shaft 18 is engaged by a pawl 22 to prevent retrogressive movement which would allow the film 25 to become slack.

The film 25 is trained through a way which extends between the upper spool 15 and the takeup spool 16 on the forward side of a masking partition 26 best shown in FIG. 7. The particular film (No. 828) which is preferably used is paperbacked, the backing being shown at 27.

The usual pressure plate 28 engages the film to hold it smoothly trained across the masking partition 26, the said plate being supported by leaf springs 29.

The springs and pressure plate are carried from a relatively movable panel part 30 of casing 10 which is hooked into the bottom of the main part of the casing at 31 and at its upper end has an aperture 32 providing a shoulder engaged by the hooked end of a spring detent 33 riveted to the fixed part of the casing. The spring detent is covered by a convex slide section 34 of the casing which has a rivet 35 engaged in a slot of the leaf spring detent. In the full line position of the parts in FIG. 4, the rivet 35 is close enough to the anchored end of the detent spring so that the spring is amply strong to hold the slide securely in registry with the case. However, the slide 34 may be moved bodily to the left as viewed in FIG. 4 to the dotted line position shown, in which position it may then be used as a lever and swung bodily upwardly to retract the detent spring from the aperture 32 of panel 30, thus allowing the panel to be withdrawn to give access to the film spools.

The masking partition 26 has side by side openings 40 and 41 which frame the photographic images projected on the face of the film. At opposite sides of these openings are flanges 42 and 43 slightly offset from the masking partition 26 to provide channels in which the margins of the shutter belt 45 are disposed to prevent light leaks.

As best shown at FIG. 4, this belt operates over an actuating drum 46 and a pair of rollers 47 and 48. The belt has two pairs of openings 50 and 51 which, in the course of movement of the belt will register with openings 40 and 41 of the masking partition 26, as shown in FIG. 7, to permit light to pass to the web 25 of sensitized film.

As best shown in FIGS. 9 and 10, the shutter belt and its control drum 46 are intergeared. The shutter belt 45 has rows of teeth at 44 and a rib 49, both the teeth and the rib desirably being molded integrally with the belt or vulcanized thereto.

The actuating drum or roll 46 has teeth 56 meshing with teeth 44 of the belt and has a groove at 57 in which the rib 49 of the belt is engaged. Thus the belt is constrained to move precisely in accordance with the rotation of the drum or roll 46 and is not permitted displacement axially of the drum. Thus, one of the pairs of openings 50 and 51 of the belt are registered with the frame and openings 40 and 41 of the masking partition every time the drum or roll 46 makes one complete rotation. The teeth assure synchronism.

The actuating roll 46 for the shutter belt 45 should bear some predetermined relationship to the dimensions of the belt since the belt, in this device, always moves in the same direction, instead of being wound reversely preliminary to exposure, as is the case in ordinary focal plane shutters. In practice, I provide two sets of windows 50 and 51 in the belt and make the inner periphery of the belt exactly twice the circumference of the outer periphery of roll 46 so that there is one exposure in each rotation of the roll and each corresponding half rotation of the belt. An arrangement for operating and controlling the belt, simplified from that designed for actual practice, is shown in FIGS. 4, 5 and 6.

A shaft 52 having an exposed winding knob 53 has anchored to it one end of the torsion spring 54, the opposite end of which is anchored to the driving roll 46. One full rotation of shaft 52 preliminary to each exposure will maintain the torsion spring 54 under predetermined uniform tension which is held by engagement of pawl 55 (FIG. 3) with ratchet wheel 60 on the winding shaft 52.

The actuating roll 46 for the belt is mounted rotatably on shaft 52 but is restrained from rotation by engagement of its radially projecting peg 58 with a shoulder 59 in the communicating leg 60 between the axially offset ends of a helical slot 61 in the periphery of control plunger 62.

The control plunger is normally urged outwardly to the position shown in FIGS. 3 and 6 by compression spring 63. The outer end of this plunger is formed as a push button 64 (FIGS. 1 to 3 and 5) exposed in notch 65 of the casing. When the operator pushes the plunger inwardly, the communicating leg 60 of the helical slot 61 advances past the peg 58 until the latter is passed by shoulder 59. Thereupon the drive roll 46 becomes free to rotate and it turns rapidly, advancing the shutter belt 45 for one-half its length and at the same time feeding the peg 58 peripherally of the helical slot 61, whereby the button 64 gradually moves outwardly to a position such that the peg 58 ultimately is stopped again by shoulder 59 in the position of the parts shown in FIG. 6.

In the course of belt travel, one pair of the generally rectangular windows 50 and 51 of the belt have registered with the stationary windows 40 and 41 of the masking partition 26, whereby the emulsion side of the film web 25 is exposed to such light as exists in the interior of the belt. As will now be shown, the optical system conveys left and right hand images of the scene to be photographed past the side margins of the film web and projects these images through the windows of the masking partition, whereby they reach the film during the interval for which the openings of the shutter register with windows of the mask.

As already indicated, it is a very important feature of the present invention to carry the respective right and left hand images past the sides of the film and to project them inwardly and thence against the face of the film. It is this feature which results in photographing the respective images in their proper relative positions on the film to make mechanical transposition unnecessary, at the same time providing proper interocular spacing on any film narrower than the interocular distance.

To accomplish this result, the casing 10 is provided with right and left hand openings 70 and 71 which are desirably covered with glasses 72 and 73 for the exclusion of dust. Immediately behind the openings 70 and 71 are first surface mirrors 74 and 75, respectively, which are set at an appropriate angle (a 45° angle being illustrated) to direct the light through the lens assembly 76, 77 mounted in the front-to-rear partitions 12 and 11 respectively.

The light focused by the lenses 76 and 77 encounters oblique first surface mirrors 78 and 79, respectively (these being shown at a 45° angle), whereby the focused light is directed through the openings 40 and 41 of the partition mask 26 subject to the control of the shutter belt 45. The first surface mirrors 78 and 79 may conveniently be formed on the surfaces of a prism 80 although no prismatic effect is required to accomplish the results described.

Desirably, the apex of the triangular prismatic support 80 for first surface mirrors 78 and 79 has a flattened area at 81 which lies directly opposite a central web 82 intervening between the openings 40 and 41 of mask 26. The unapertured central portion 83 of the shutter belt 45 is confined between surfaces 81 and 82 without leakage of light.

It will, of course, be understood that prismatic mirrors may be substituted for the first surface mirrors if desired as shown at 750 and 790 in FIG. 11.

By reason of this optical system, the right- and left-hand images are automatically received upon the film or plate in the proper positions for direct viewing. Therefore, consistent alignment and spacing of the images side by side in pairs upon the sensitized member 25 is assured automatically in the functioning of the camera. The pairs of photographs are mounted and handled unitarily at all times, the individual photographs comprising the separate pairs never requiring separation from the film or plate upon which the images are taken in the first instance. Photographic reproductions from these paired images will necessarily have the same characteristics of proper registration and spacing.

Compact as the camera is, ample space is available for the provision of a finder comprising a glassed window 83 and lens 84 which, however, is conventional and forms no part of the present invention.

The lenses 76 and 77 are protected to an unparalleled degree, being wholly within the case at all times. There is neither any projecting lens barrel or finder, nor does any hinged front require to be opened before the camera can be used. Yet the lens and the mirrors are fully protected against dust.

While there is considerable choice possible in the selection of film appropriate for use in this camera, practical considerations have strongly suggested the number 828 size of film. In the first place, it is already available on the market and no special film is required. In the second place, it lends itself to the optical system disclosed because it is not so wide as to require an unduly wide spacing of the image-receiving openings 72 and 73. In the third place, it is sufficiently wide to make good use of the space available between the image-receiving openings 72 and 73 when these are spaced at optimum separation.

It is broadly immaterial how the operator knows how much to transport the film. As the simplest available means of determining the distance for film transport following each exposure, I have shown windows at 86 and 87 to which the exposure numbers on the film backing paper will be successively advanced to the operator's view. If the film used does not have a backing paper (a 35 mm. film does not), any one of the conventional devices for limiting film transport to one frame of advance can be adapted to this camera.

It will also be obvious to those skilled in the art that many of the features in this camera are of generic application to cameras of various types and are not to be regarded as essentially limited to stereoscopic use. This is true even of the optical system in its relation to the sensitized medium, with or without the focal plane shutter in the form of a band as shown. It will be appreciated however, that this organization reaches its maximum value in a stereoscopic camera.

I claim:

1. In a camera, the combination with a pair of spaced guides, of an endless belt operating over said guides and having spaced runs one of which is apertured and constitutes a focal plane shutter, means for supporting behind and in close proximity to the last mentioned run an image-receiving member having a photo-sensitized surface, trip-controlled means for actuating the shutter, a mirror disposed obliquely between said runs for reflecting toward said surface subject to control by said shutter light received laterally between the runs, and a case enclosing said runs and provided with a light focusing lens disposed on an axis which extends between said runs and is transverse respecting the movement of the run constituting the shutter.

2. In a camera, the combination with a case having a front wall and a forwardly directed light-receiving opening and provided interiorly with means for supporting across its front wall a photographic member having a sensitized surface, of an optical system including a lens disposed behind the wall and having its axis transverse respecting the opening and offset therefrom, and reflecting means for receiving light from said opening and directing such light through the lens and transversely across said surface, and thence focusing said light forwardly against said surface, the case being provided with a partition extending from front to rear at one side of said surface, the lens being mounted in said partition within the case.

3. A camera comprising a case provided interiorly and adjacent its front with means for supporting a photographic member having a rearwardly exposable sensitized surface, an optical system comprising a pair of mirrors at opposite sides of said member for receiving light from in front of the camera and directing such light inwardly, a second pair of mirrors for directing such light thence forwardly upon said surface, said optical system including lenses for focusing upon said surface the light received and directed thereto, and shutter means controlling the light, the shutter comprising an endless band having one run between the second pair of mirrors and the surface and another run behind the mirrors.

4. In a camera for impressing stereoscopic pairs of photographic images upon a member having a rearwardly directed sensitized surface, the combination with a case within which said surface is disposed, of separate spaced optical systems for receiving light from in front of the camera at opposite sides of said surface and directing the received light inwardly and thence forwardly against said surface, each of said systems comprising a plurality of mirrors, and lenses behind the sensitized surface and disposed between mirrors on axes generally parallel to said surface and each comprising means for focusing upon said surface the light directed from one mirror to another in the respective systems, and means for controlling the movement of said light to said surface for limiting exposure.

5. In a camera for impressing stereoscopic pairs of photographic images upon a member having a rearwardly directed sensitized surface, the combination with a case within which said surface is disposed, of separate spaced optical systems for receiving light from in front of the camera at opposite sides of said surface and directing the received light inwardly and thence forwardly against said surface, each of said systems comprising a plurality of mirrors, and lenses behind the sensitized surface and disposed between mirrors on axes generally parallel to said surface and each comprising means for focusing upon said surface the light directed from one mirror to another in the respective systems, and means for controlling the movement of said light to said surface for limiting exposure, the exposure limiting means comprising an endless band focal plane shutter having upper and lower guides and forwardly and rearwardly spaced runs between which certain of the mirrors aforesaid are located.

6. The device of claim 4 in which said member comprises a roll of film in further combination with spools for which said camera provides spool supports above and below the said surface, the camera case including at the sides of said film partitions extending forwardly and rearwardly therein, the lenses being mounted in the partitions.

7. The device of claim 6 in further combination wtih a windowed endless band focal plane shutter having upper and lower guides and forwardly and rearwardly spaced runs, one of which is proximate to the said surface and between which runs certain of the mirrors aforesaid are disposed.

8. In a stereoscopic camera for producing stereoscopic pairs of pictures on roll film, the combination with a camera case having upper and lower spools between which the film may be trained at the front of the case, means providing a way through which the film may be trained for transport from one spool to the other, said way means comprising a baffle having laterally adjacent framing openings and disposed behind the film and through which the film may be exposed to image-forming light, means providing reflecting surfaces behind the framing openings and convergent toward the plane of the baffle means between said openings, means offset laterally from opposite sides of the film transport way for picking up light reflected from an object to be photographed and for directing such light laterally in opposite directions toward the reflecting means aforesaid, and lens means disposed between the respective reflective surfaces and the corresponding directing means in substantial axial alignment with each other in a plane behind the film in said way, said lens means being adapted to focus light thus picked up and to direct such focused light through the framing openings to form images upon a film in said way.

9. A stereoscopic camera comprising upper and lower film spools, a case having supports for said spools, means forming a transport way for guiding film between said spools, mirrors disposed behind the way and converging forwardly toward the way, substantially coaxial lenses at opposite sides of the mirrors and disposed upon an axis transverse and spaced rearwardly respecting the way, the case including means for excluding from the way light except such as traverses said lenses, and oblique mirrors for picking up light from an object forwardly of the camera and directing such light through said lenses in opposite directions toward the mirrors first mentioned to project images of the object forwardly toward said way.

10. A stereoscopic camera comprising upper and lower film spools, a case having supports for said spools, means forming a transport way for guiding film between said spools, mirrors disposed behind the way and converging forwardly toward the way, substantially coaxial lenses at opposite sides of the mirrors and disposed upon an axis transverse respecting the way, the case including means for excluding from the way light except such as traverses said lenses, and oblique mirrors for picking up light from an object forwardly of the camera and directing such light through said lenses in opposite directions toward the mirrors first mentioned to project images of the object forwardly toward said way, together with a framing baffle at the rear of said way and an endless focal plane shutter belt having upper and lower guides and one run between said way and the mirrors first mentioned and another run behind said mirrors, said belt having exposure openings, the light controlled thereby being admitted laterally between the respective runs.

11. A stereoscopic camera comprising the combination with a case having front, rear and side walls forming a film chamber, substantially coaxial lenses mounted in the side walls, means adjacent the front wall defining a film transport way offset forwardly from the axis of said lenses, film spools having mounts above and below the axis of said lenses and adapted to support a film trained through said way, said film having a sensitized surface directed rearwardly, oblique mirrors across the common axis of said lenses and converging toward said way for directing light from said lenses upon the sensitized surface of a film in said way, and pickup mirrors outside of said chamber and laterally offset from the lenses and disposed obliquely across the common axis thereof in a forwardly diverging direction for receiving light from an object forwardly of the camera and directing it into said lenses.

12. The device of claim 11 in which the camera case has external side walls within which said last mentioned mirrors are disposed, the lenses being wholly within the case and the front wall of the case being provided with window openings registering with the last mentioned mirrors for admitting light thereto from an object to be photographed.

13. A stereoscopic camera comprising the combination with a case having front, rear and side walls forming a film chamber, substantially coaxial lenses mounted in the side walls, means adjacent the front wall defining a film transport way offset from the axis of said lenses, film spools having mounts above and below the axis of said lenses and adapted to support a film trained through said way, said film having a sensitized surface directed rearwardly, oblique mirrors across the common axis of said lenses and converging toward said way for directing light from said lenses upon the sensitized surface of a film in said way, and pickup mirrors laterally offset from the lenses and disposed obliquely across the common axis thereof in a forwardly diverging direction for receiving light from an object forwardly of the camera and directing it into said lenses, said case having external side walls within which said last mentioned mirrors are disposed, the lenses being wholly within the case, the common axis of the lenses being parallel to the front wall of the case and the front wall being provided with window openings registering with said pickup mirrors for admitting light to the lenses from the objects in front of the case, the camera case being provided with a framing baffle between the spools and behind the way, and in further combination with a focal plane shutter comprising an endless belt having a run in immediate proximity to the framing baffle and between the framing baffle and the oblique mirrors first mentioned and another run behind the mirrors first mentioned, and means for operating the belt, the said belt having upper and lower guides over which it operates and the said belt and framing baffle having openings registrable in the movement of the belt to admit light from the first mentioned mirrors to a film in the way.

References Cited in the file of this patent

UNITED STATES PATENTS

| | | |
|---|---|---|
| 684,750 | Traley | Oct. 15, 1901 |
| 1,379,189 | King | May 24, 1921 |
| 2,390,932 | Fitz | Dec. 11, 1945 |
| 2,464,673 | Debrie | Mar. 15, 1949 |
| 2,713,293 | Faulhaber | July 19, 1955 |
| 2,778,288 | Steffen | Jan. 22, 1957 |

FOREIGN PATENTS

| | | |
|---|---|---|
| 326,470 | France | Apr. 29, 1903 |